United States Patent [19]

Anderson

[11] Patent Number: 4,776,800
[45] Date of Patent: Oct. 11, 1988

[54] ASSOCIATIVE TRAINING GARMENT

[76] Inventor: Pat Anderson, 5308 Grantland Dr., Covina, Calif. 91722

[21] Appl. No.: 121,978

[22] Filed: Nov. 18, 1987

[51] Int. Cl.⁴ .............................................. G09B 19/00
[52] U.S. Cl. ...................................... 434/247; 2/246; D2/10; D2/225
[58] Field of Search ...................... 434/247, 258, 238; 2/115, 244, 246, 400; D2/6, 10, 36, 42, 208, 209, 212, 214, 215, 225, 226; D20/11

[56] References Cited

U.S. PATENT DOCUMENTS

D. 165,506 12/1951 Brenner ................................. D2/42
D. 275,620 9/1984 Ellis .................................. D2/209 X
3,237,625 3/1966 Johnson .............................. 604/396

OTHER PUBLICATIONS

*Dimension Weld Appliques;* Earnshaw's Infants & Children's Review, p. 3, Aug. 1973.

*Primary Examiner*—William H. Grieb
*Attorney, Agent, or Firm*—Nilsson, Robbins, Dalgarn, Berliner, Carson & Wurst

[57] ABSTRACT

A training garment for a child is provided which includes a decorative article capable of association with adult behavior in the mind of the wearer of the garment, and which thus assists in the cognitive development of a desire to employ toilet facilities.

2 Claims, 1 Drawing Sheet

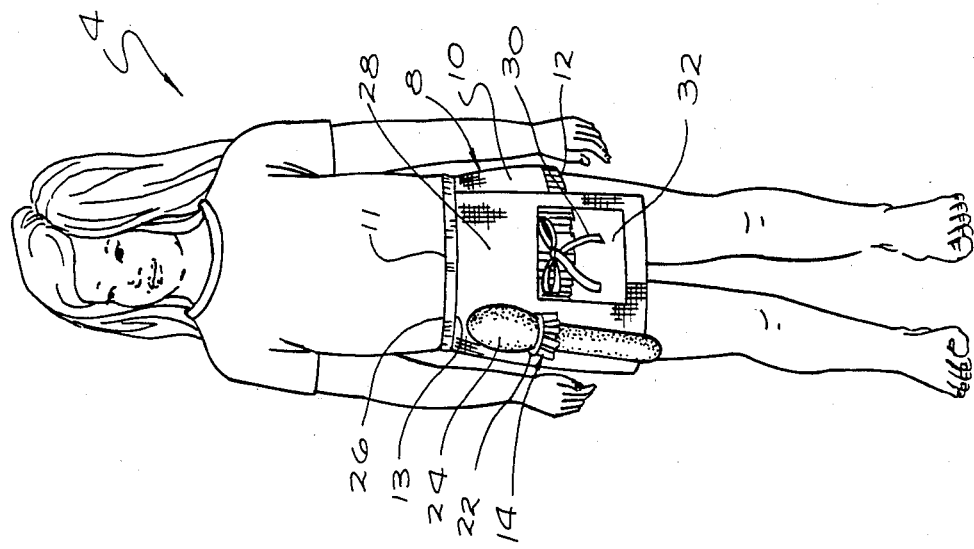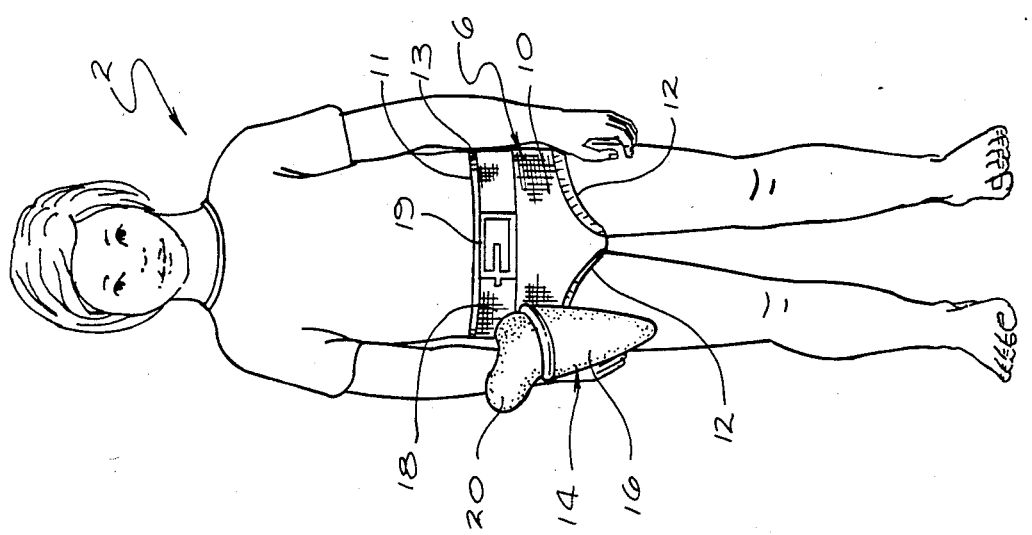

ASSOCIATIVE TRAINING GARMENT

FIELD OF THE INVENTION

This invention is concerned with improved training pants for infants and children, and with methods for the use of such garments.

BACKGROUND OF THE INVENTION

Nether garments such as diapers have been employed for many years in the care of infants prior to the motor development of the muscles which allow voluntary control of the organs of elimination. When some order of control is attained, training pants have been employed to allow the cognitive learning of the proper use of toilet facilities. While a variety of garments has been termed training pants, in fact such garments have little to do with the training of the child other than to serve as a new and different attire to a child accustomed to diapers. Some training pants serve only to ameliorate the effects of the child's periodic incontinence during the toilet training period, and are thus constructed of plastic or rubber material. Further, some training pants have incorporated both hydrophobic and hydrophilic layers, generally with the hydrophobic layer next to the body for the purpose of keeping the body dry, with fluids being absorbed by an adjacent hydrophilic layer.

These garments, though widely accepted, have certain disadvantages in that regressive behavior is reinforced to the extent that the garments appear to be similar to diapers, and thus the garments alone have little effect in motivating the child toward the desired behavior.

SUMMARY OF THE INVENTION

According to the present invention, a fabric training garment provides a covering for the lower torso and defines a waist opening and two leg openings. The garment includes on an exterior portion a decorative article capable of association with adult behavior in the mind of the child wearing the garment. A variety of decorative articles may be employed with the garment. Preferably, the article is one which a child will associate with a role model perceived to employ toilet facilities. For example, an article associated by the child with a mother, father, cowboy, cook, soldier, policewoman or other potential role model may be employed. At an appropriate time in the child's cognitive development, the garment of the invention may be employed in a method for assisting a child to learn to employ toilet facilities for necessary bodily functions by attiring the child in the garment including the decorative article capable of such association with an adult role model and advising the child that the role model associated with the decorative article employs toilet facilities and is capable of controlling excretory function.

BRIEF DESCRIPTION OF THE DRAWING

The FIGURE is a perspective view of two infants wearing the training pants of the invention.

DETAILED DESCRIPTION OF PREFERRED EMBODIMENT

Details of illustrative embodiments of the invention are set forth herein. However, it is to be understood that the embodiments decribe and exemplify an invention which may take forms different from the specific embodiments disclosed. Structural and functional details are not necessarily to be interpreted as limiting, but rather as a basis for the claims.

Turning now to the FIGURE, infants 2 and 4 are seen to be attired in training pants 6 and 8 which are constructed and adapted to be used in accordance with the invention. In the two embodiments set forth and identified by the reference numerals 6 and 8, similar reference numerals will be used to describe similar parts or details.

The training pants 6 and 8 are each seen to include a thigh-length pantaloon portion 10 defining a waist opening 11 and two leg openings 12. The portion 10 may be constructed from a variety of fabrics according to methods which are known in the art, but preferably constructed from a washable cotton material, with an elastic waistband 13 to maintain the pants 6 and 8 in position. The training pants 6 and 8 are each seen to thus cover the respective nether portions, not specifically shown, of the infants 2 and 4 with the cotton material. If preferred, commercially available training pants may be employed as the pantaloon portions 10.

The training pants 6 and 8 are each seen to include an external decorative item, indicated generally by the reference numeral 14, which is capable of association with adults or adult behavior in the mind of most infants. Preferably, any of the decorative items which may be attached to the training pants 10 are constructed from fabric or other resilient material which eliminates the danger of injury due to the infant falling on the decorative item, or other dangers associated with rigid instruments in the hands of infants. Specifically, the training garment 6 is seen to include a holster 16 depending from a belt 18. The holder 16 is constructed from double-sided, quilted cotton fabric and the belt 18 may be constructed from bias tape sewn onto the pants 16, and includes an appliqued belt buckle 19. The belt and holster may be constructed in any one of a number of shapes, but preferably are constructed in a manner which enables stitching both the belt and the holster to the training pants so that the infant does not lose the association between the adult-associated item and the training pants during washing or storage.

The holster 16 is seen to encompass a simulated pistol 20, which is constructed of double-sided, quilted cotton fabric filled with polyester stuffing. As with the other decorative items described herein, the holster 16, belt 18 and pistol 20 may be decorated with lace, ribbon or other items as desired.

In a similar manner, the training garment 8 includes a suspension loop 22 formed from a lace strip, 10 and sized to receive a cooking utensil such as the spoon 24, which is constructed from quilted fabric extended with polyester stuffing in the preferred shape. In addition, the training garment 8 includes a decorative belt or strap 26 which appears to support an apron 28 bearing a decorative bow 30 attached to a pocket 32.

A wide variety of decorative and toy-like items capable of association with adult behavior may be employed with the training pants of the invention, depending upon the psychological development and associations of the individual infant. For example, carpenters' belts and hammers, telephone repair equipment, large key rings, automobile repair equipment or other associative items may be employed.

The above-described training pants have proven to be capable of association with adult behavior by infants. For example, upon donning the training pants 8 an infant immediately obtained a bowl, withdrew the spoon 24 and began mixing imaginary food. Having established an association in the wearer's mind between adult (i.e., role model) and proper control of excretory functions, the toilet training of the child will be greatly facilitated by having the child associate the wearing of the training pants with such adult behavior. For example, the child could be brought to realize that the role models with whom the child identifies are capable of exercising continence and employ toilet facilities for such necessary bodily functions.

Subsequent to the motor development of the muscles which control the organs of elimination, and after the child begins to evidence an appropriate degree of cognitive control, the training pants of the invention provide significant advantages in that such garments provide a positive association with adult (i.e., continent) behavior without intervention or comment from parents. The child is thus self-motivated toward consistent use of toilet facilities.

From the foregoing description, one skilled in the art can readily ascertain the essential characteristics of the invention and, without departing from the spirit and scope thereof, can adapt the invention to various usages and conditions. Changes in form and the substitution of equivalents are contemplated as circumstances may suggest or render expedient; and although specific terms have been employed herein, they are intended in a descriptive sense and not for purposes of limitation, the purview of the invention being delineated in the following claims.

I claim:

1. A method for training a child to employ toilet facilities for excretory functions, comprising the steps of:

providing a training garment which covers the lower torso of the child, the garment having a waist opening and two leg openings and including a decorative article capable of association with an adult role model in the mind of the child; and advising the child that the role model associated with the decorative article employs toilet facilities for said functions.

2. The method of claim 1 wherein the decorative article is included on an exterior portion of the garment, and is associated, by the child, with a role model perceived to employ toilet facilities.

* * * * *